United States Patent
Umetsu

(10) Patent No.: US 10,267,660 B2
(45) Date of Patent: Apr. 23, 2019

(54) SENSOR DEVICE

(71) Applicant: Alps Electric Co.,Ltd., Ota-ku, Tokyo (JP)

(72) Inventor: Eiji Umetsu, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 135 days.

(21) Appl. No.: 15/450,518

(22) Filed: Mar. 6, 2017

(65) Prior Publication Data

US 2017/0292863 A1 Oct. 12, 2017

(30) Foreign Application Priority Data

Apr. 8, 2016 (JP) .................................. 2016-078141

(51) Int. Cl.
| | | |
|---|---|---|
| *G01D 11/26* | (2006.01) | |
| *G01D 11/24* | (2006.01) | |
| *G01L 9/08* | (2006.01) | |

(52) U.S. Cl.
CPC ........... *G01D 11/245* (2013.01); *G01D 11/26* (2013.01); *G01L 9/08* (2013.01)

(58) Field of Classification Search
None
See application file for complete search history.

(56) References Cited

U.S. PATENT DOCUMENTS

| | | | | |
|---|---|---|---|---|
| 6,245,854 B1* | 6/2001 | Obioha | ................ | C09D 127/12 165/133 |
| 8,787,600 B2* | 7/2014 | Conti | ................... | B81B 7/0061 381/174 |
| 2008/0315333 A1* | 12/2008 | Combi | ................. | B81B 7/0061 257/415 |
| 2009/0067659 A1* | 3/2009 | Wang | .................. | H04R 19/005 381/355 |
| 2009/0158859 A1* | 6/2009 | Huang | ................. | G01F 1/6845 73/861.351 |
| 2013/0214365 A1* | 8/2013 | Schlarmann | .......... | G01L 9/0042 257/415 |

FOREIGN PATENT DOCUMENTS

| | | |
|---|---|---|
| JP | 2008-026183 | 2/2008 |
| JP | 2009-512202 | 3/2009 |

* cited by examiner

*Primary Examiner* — Paul M. West
*Assistant Examiner* — Mark A Shabman
(74) *Attorney, Agent, or Firm* — Beyer Law Group LLP

(57) ABSTRACT

A sensor device includes: a sensor portion having a movable thin film and a detection element configured to output a signal corresponding to displacement of the movable thin film; a frame portion disposed to surround an outside of the sensor portion; a circuit board including a circuit configured to process the signal output from the detection element; and a lid portion which is attached onto the frame portion and has a through-hole, in which a functional film having higher hydrophobicity than a surface of the lid portion is provided on at least an inner surface of the through-hole in the lid portion.

9 Claims, 5 Drawing Sheets

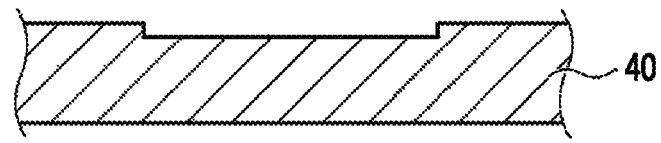
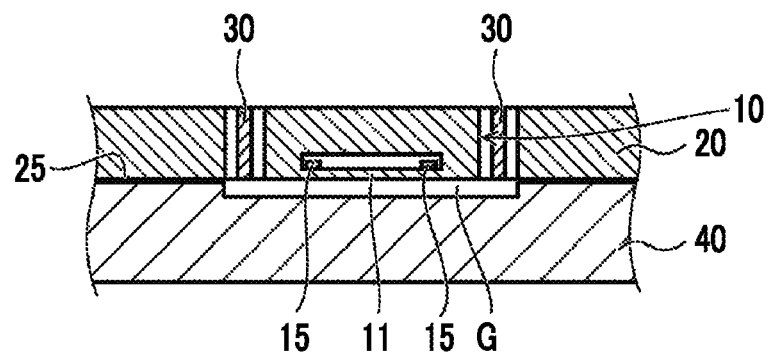
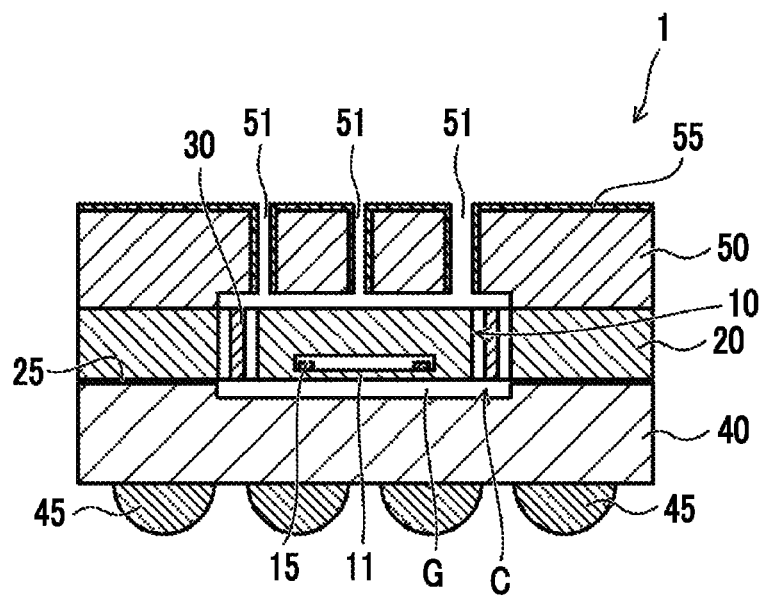

SENSOR DEVICE

CLAIM OF PRIORITY

This application claims benefit of Japanese Patent Application No. 2016-078141 filed on Apr. 8, 2016, which is hereby incorporated by reference.

BACKGROUND OF THE INVENTION

1. Field of the Invention

The present invention relates to a sensor device, and more particularly, to a sensor device including a detection element that outputs a signal corresponding to the displacement of a movable thin film.

2. Description of the Related Art

A sensor device in which a movable thin film is formed on a semiconductor substrate or the like by using a microelectromechanical systems (MEMS) technology and the displacement of the movable thin film is detected by a detection element is used in various fields as a small and highly accurate device.

The movable thin film is formed, for example, by etching a semiconductor material such as silicon to form a cavity, and causing a thin silicon film to remain on the cavity. Accurately detecting the displacement of this movable thin film is an important factor for determining the detection accuracy of the sensor device. Therefore, one side of the movable thin film needs to be kept at atmospheric pressure, and a through-hole is provided in a lid portion.

PCT Japanese Translation Patent Publication No. 2009-512202 discloses a sensor device with a substrate-level assembly. According to this prior art, the final dimensions of the sensor device can be reduced. In addition, Japanese Unexamined Patent Application Publication No. 2008-026183 discloses an IC integrated acceleration sensor which can be further reduced in overall size and height and thus can be easily manufactured.

However, in a case where the through-hole is provided in the lid portion, moisture infiltrates into the inside through the through-hole, and the movement of the movable thin film is impeded, resulting in a problem of detection failure or a reduction in detection accuracy. In addition, there may be a case where cleaning is performed to remove dust before mounting the sensor device on a substrate or in a housing. When water or a chemical used in the cleaning infiltrates into the inside through the through-hole, a process of drying the inside is necessary. In addition, when the water or chemical is not dried and moisture remains, a reduction in detection accuracy is incurred.

SUMMARY OF THE INVENTION

The present invention provides a sensor device capable of preventing infiltration of moisture into the device in which a movable thin film is provided.

In order to solve the problems, a sensor device according to an aspect of the present invention includes: a sensor portion having a movable thin film and a detection element configured to output a signal corresponding to displacement of the movable thin film; a frame portion disposed to surround an outside of the sensor portion; a circuit board including a circuit configured to process the signal output from the detection element; and a lid portion which is attached onto the frame portion and has a through-hole, in which a functional film having higher hydrophobicity than a surface of the lid portion is provided on at least an inner surface of the through-hole in the lid portion.

In this configuration, even though the through-hole is provided in the lid portion, since the functional film is provided on the inner surface of the through-hole, hydrophobicity against moisture infiltrating into the inside from the outside through the through-hole is exhibited, and thus waterproofness can be enhanced.

In the sensor device according to the aspect of the present invention, the functional film may be provided in a range from the surface of the lid portion to the inner surface of the through-hole. Accordingly, hydrophobicity can be effectively exhibited in a range from the surface of the lid portion to the inner surface of the through-hole.

In the sensor device according to the aspect of the present invention, the functional film may contain fluorocarbon. Accordingly, the hydrophobicity of the functional film can be enhanced.

In the sensor device according to the aspect of the present invention, the lid portion may be formed of silicon. Accordingly, the through-hole can be formed by performing anisotropic etching on silicon, and the functional film can be formed on the inner surface of the through-hole by a reaction with gas during the etching.

In the sensor device according to the aspect of the present invention, the lid portion, the frame portion, and the circuit board may be connected to be electrically connected to each other. Accordingly, the electromagnetic shielding effect of the lid portion, the frame portion, and the circuit board on the sensor portion can be obtained.

In the sensor device according to the aspect of the present invention, potentials of the lid portion and the frame portion may be set to a reference potential of the circuit board. Accordingly, the lid portion and the frame portion are set to the reference potential of the circuit board, and thus the electromagnetic shielding effect on the sensor portion can be obtained.

According to the aspect of the present invention, it is possible to provide the sensor device capable of preventing infiltration of moisture into the device in which the movable thin film is provided.

BRIEF DESCRIPTION OF THE DRAWINGS

FIGS. 2A to 2C are sectional views illustrating a manufacturing method of the sensor device.

DESCRIPTION OF THE PREFERRED EMBODIMENTS

Figure 1:
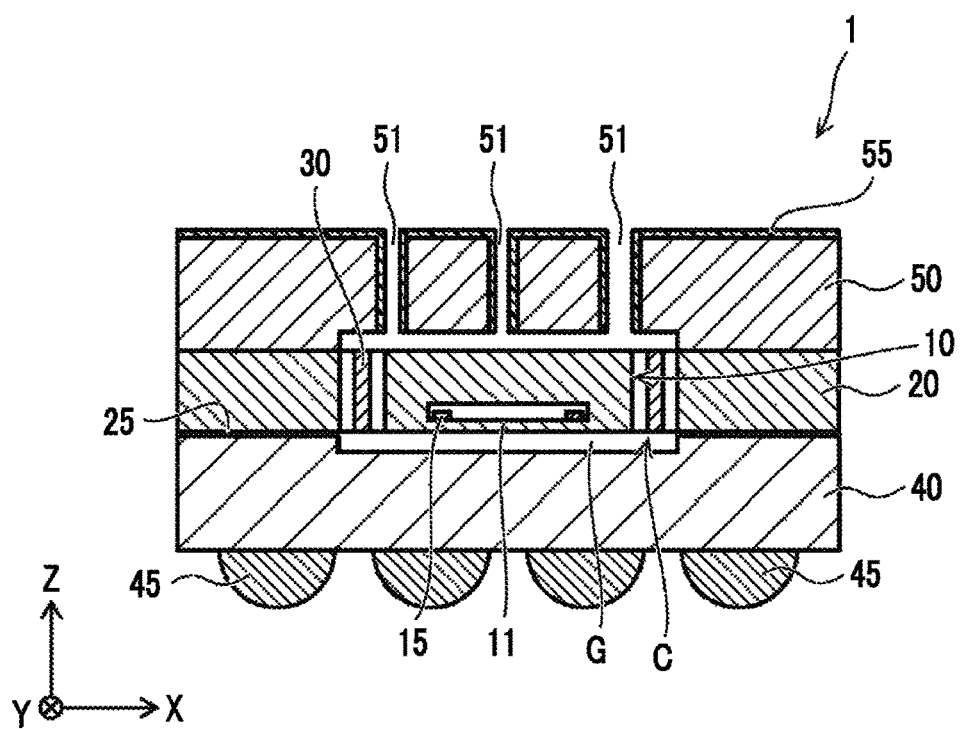
FIG. 1 is a sectional view illustrating a sensor device according to an embodiment.

Hereinafter, an embodiment of the present invention will be described with reference to the drawings. In the following description, like elements are denoted by like reference numerals, and description of members once described is appropriately omitted.

(Configuration of Sensor Device)

FIG. 1 is a sectional view illustrating a sensor device according to the embodiment.

A sensor device 1 according to the embodiment includes a sensor portion 10 having a movable thin film 11 and a detection element 15 that outputs a signal corresponding to the displacement of the movable thin film 11. The detection element 15 of the sensor portion 10 is, for example, a piezoresistive element or a capacitive element. Accordingly, various physical quantities such as pressure, acceleration, temperature, humidity, and sound pressure are detected. In the embodiment, the sensor portion 10 is configured to detect pressure as an example.

The sensor device 1 includes a frame portion 20 disposed so as to surround the outside of the sensor portion 10, a circuit board 40 including a circuit which processes a signal output from the detection element 15, and a lid portion 50 which is attached onto the frame portion 20 and has through-holes 51.

In the sensor device 1, the frame portion 20 is laminated on the circuit board 40. Accordingly, a gap G is formed between the sensor portion 10 and the circuit board 40. In the embodiment, for convenience of explanation, it is assumed that a direction in which the frame portion 20 and the circuit board 40 are laminated is a Z direction, one of the directions orthogonal to the Z direction is an X direction, and the direction orthogonal to the Z direction and the X direction is a Y direction. A direction from the circuit board 40 toward the frame portion 20 in the Z direction is referred to as upward, a relatively upper side is referred to as a surface side, a direction from the frame portion 20 toward the circuit board 40 is referred to as downward, and a relatively lower side is referred to as a rear surface side.

The sensor portion 10 has the movable thin film 11 formed by etching a semiconductor such as silicon. The movable thin film 11 is referred to as, for example, a membrane or diaphragm. The outer shape of the movable thin film 11 in a plan view is, for example, a rectangular shape, which is provided on the slightly inside of the outer shape of the sensor portion 10 in the plan view. The detection element 15 is attached to the movable thin film 11. For example, the detection element 15 is attached to each of the center portions of the four sides of the movable thin film 11.

The movable thin film 11 is distorted by pressure such that an electrical signal corresponding to the distortion transmitted to the detection element 15 is obtained. A bridge circuit is constituted by the four detection elements 15 such that the displacement of the movable thin film 11 can be detected as an electrical signal.

The circuit board 40 is, for example, an application-specific integrated circuit (ASIC), has a circuit formed by a semiconductor process using a semiconductor wafer, and is formed in a chip shape by dicing. On the rear surface of the circuit board 40, bump electrodes 45 which are electrically connected to the circuit are provided.

The frame portion 20 is laminated on the circuit board 40 via a bonding member 25. The bonding member 25 is provided in an annular shape along the frame portion 20. As the bonding member 25, for example, an adhesive or a member using intermetallic bonding is used. As the intermetallic bonding, for example, eutectic bonding using Al—Ge or Au—Su, or diffusion bonding using Au—Au is used. As the annular bonding member 25 is provided on a contact surface between the frame portion 20 and the circuit board 40, the sealing properties are enhanced.

The outer shape of the frame portion 20 in the plan view is, for example, a rectangular shape. Furthermore, the outer shape of a cavity C provided on the inside of the frame portion 20 in the plan view is also a rectangular shape, for example. In the embodiment, the rectangular shape includes cases where slight roundness or minute edges are formed at the corners during manufacturing. For example, silicon is used for the frame portion 20. The sensor portion 10 is disposed in the cavity C which is the inside of the frame portion 20. The sensor portion 10 is supported by a spring portion 30 with respect to the frame portion 20.

The lid portion 50 is provided on the frame portion 20. For the lid portion 50, for example, silicon is used. The frame portion 20 and the lid portion 50 are connected to each other, for example, by intermetallic bonding. The intermetallic bonding is as described above. The through-holes 51 are provided in the lid portion 50. Accordingly, in a state of being covered with the lid portion 50, the pressure in the space of the cavity C is brought to the outside air pressure (for example, the atmospheric pressure) by the through-holes 51.

In the sensor device 1 according to the embodiment, a functional film 55 having higher hydrophobicity than the surface of the lid portion 50 is provided on at least the inner surfaces of the through-holes 51 in the lid portion 50. In the example illustrated in FIG. 1, the functional film 55 is provided in a range from the surface of the lid portion 50 to the inner surfaces of the through-holes 51. As the functional film 55 is provided, even when there is moisture or humidity on the outside of the sensor device 1, the water-repellent effect is exhibited by the hydrophobicity of the functional film 55. Therefore, infiltration of moisture or humidity into the inside of the sensor device 1 through the through-holes 51 can be prevented.

There may be a case where the sensor device 1 is cleaned with water or a chemical through ultrasonic cleaning or the like after being mounted on a substrate or the like. Even in the case where such cleaning is performed, infiltration of water into the inside of the sensor device 1 through the through-holes 51 can be prevented. Accordingly, a drying process after the cleaning can be simplified, and erroneous detection or a reduction in the detection accuracy of the sensor device 1 due to the infiltration of moisture can be prevented.

In the sensor device 1, since the lid portion 50, the frame portion 20, and the circuit board 40 are connected to be electrically connected to each other, the electromagnetic shielding effect of the lid portion 50, the frame portion 20, and the circuit board 40 on the sensor portion 10 can be obtained. Here, electrical connection means a state of ohmic contact. The potentials of the lid portion 50 and the frame portion 20 may be the reference potential (for example, the driving potential or ground potential) of the circuit board 40. Accordingly, the lid portion 50 and the frame portion 20 are set to the reference potential of the circuit board 40, and the electromagnetic shielding effect on the sensor portion 10 can be enhanced.

(Manufacturing Method of Sensor Device)

FIGS. 2A to 2C are sectional views illustrating a manufacturing method of the sensor device.

First, as illustrated in FIG. 2A, the circuit board 40 is prepared. The circuit board 40 includes a processing circuit patterned on a semiconductor substrate such as silicon.

Next, as illustrated in FIG. 2B, the frame portion 20 is connected onto the circuit board 40. The sensor portion 10 is connected to the inside of the frame portion 20 via the spring portion 30. The circuit board 40 and the frame portion 20 are connected to each other by an adhesive or a member using intermetallic bonding. For the intermetallic bonding, base films (TiN or Ta) are respectively formed on the bonding surfaces of the circuit board 40 and the frame portion 20, and metals for the intermetallic bonding are formed on the base films and are bonded together by heating.

Examples of the intermetallic bonding include eutectic bonding using Al—Ge or Au—Su, and diffusion bonding using Au—Au. For the eutectic bonding using Al—Ge, Al or Ge is formed on one of members to be bonded together (the circuit board 40 and the frame portion 20), Ge or Al is formed on the other, and the two are brought into contact with each other and are heated to a temperature of, for example, 400° C. or higher so as to be bonded together. For the eutectic bonding using Au—Su, Au or Su is formed on one of members to be bonded together, Su or Au is formed on the other, and the two are brought into contact with each other and are heated to a temperature of, for example, 300° C. or higher so as to be bonded together. In addition, for the diffusion bonding using Au—Au, Au is formed on each of members to be bonded together, and the two are brought into contact with each other and are heated to a temperature of, for example, about 200° C. to 300° C. so as to be bonded together.

Next, as illustrated in FIG. 2C, the lid portion 50 is connected onto the frame portion 20. The frame portion 20 and the lid portion 50 are connected to each other by an adhesive or a member using intermetallic bonding. The intermetallic bonding is the same as the intermetallic bonding between the circuit board 40 and the frame portion 20. In the lid portion 50, the through-holes 51 and the functional film 55 are provided in advance. A manufacturing method of the lid portion 50 will be described later.

After the lid portion 50 is connected, the bump electrodes 45 are formed on the rear surface of the circuit board 40. For example, the bump electrodes 45 are formed by forming Au or solder on Al or the like as the base in a ball shape by plating or the like. Thereafter, the circuit board 40, the frame portion 20, and the lid portion 50 are cut by dicing or the like, thereby completing individual sensor devices 1.

Figure 3A:
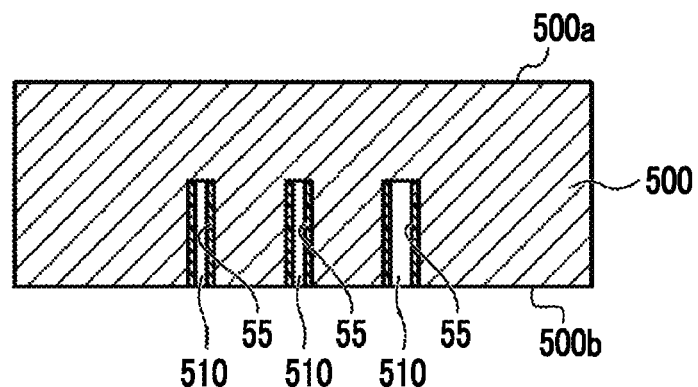
FIGS. 3A to 3C are sectional views illustrating a manufacturing method of a lid portion.
Figure 3B:
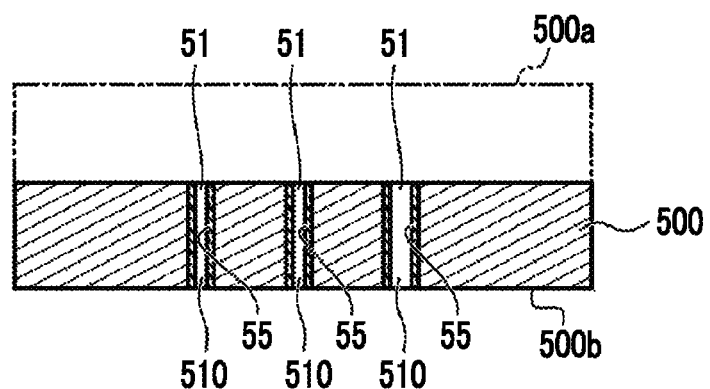
Figure 3C:
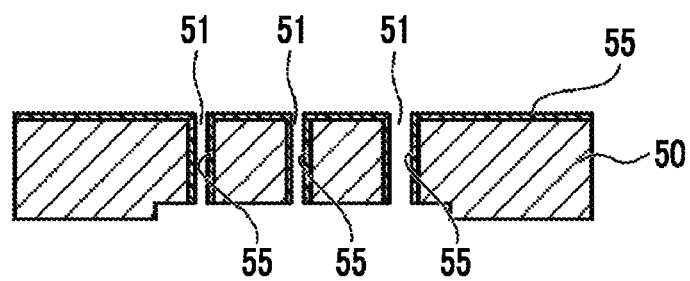

FIGS. 3A to 3C are sectional views illustrating a manufacturing method of the lid portion.

First, as illustrated in FIG. 3A, holes 510 are formed in a rear surface 500b of a substrate 500 such as silicon by, for example, deep reactive-ion etching (RIE). The holes 510 are formed in portions which are to be the through-holes 51. When the holes 510 are formed by RIE, fluorocarbon (for example, C4F8) is formed on the inner wall surfaces of the holes 510 by an etching gas. The fluorocarbon can be used as the hydrophobic functional film 55.

Next, as illustrated in FIG. 3B, a surface 500a of the substrate 500 is polished to the positions of the holes 510. Accordingly, the holes 510 become the through-holes 51.

Next, as illustrated in FIG. 3C, RIE is performed on the surface 500a of the substrate 500, and cleaning is performed thereon. At this time, the functional film 55 of fluorocarbon is also formed on the surface 500a of the substrate 500. Thereafter, the substrate 500 is divided into individual pieces by dicing or the like. Accordingly, the lid portion 50 is completed.

(Waterproofing Treatment)

Figure 4A:
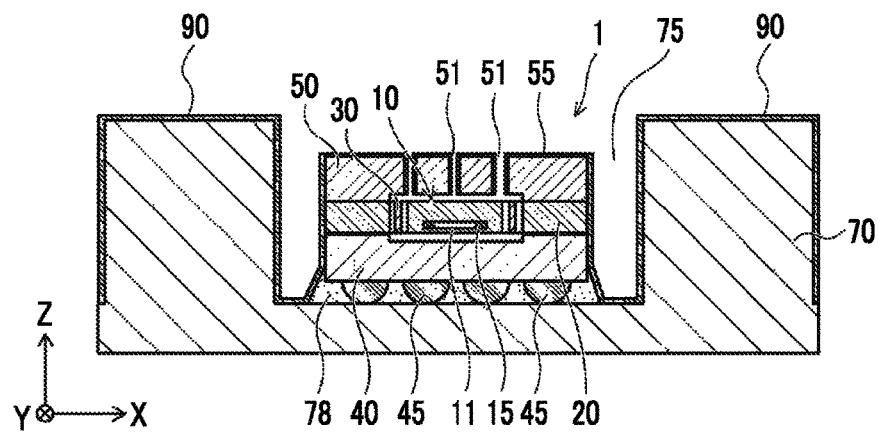
FIGS. 4A and 4B are sectional views illustrating an example of a waterproofing treatment.
Figure 4B:
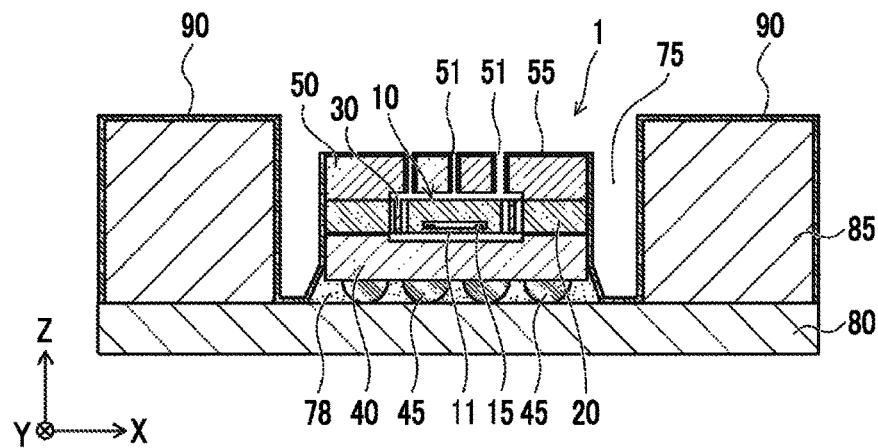

Next, a waterproofing treatment of the sensor device 1 will be described. FIGS. 4A and 4B are sectional views illustrating an example of the waterproofing treatment.

FIG. 4A illustrates an example in which the sensor device 1 is mounted in a cavity housing 70. The cavity housing 70 is provided with a cavity 75 serving as a recess. For example, a silicon substrate is used for the cavity housing 70, and the cavity 75 is provided by etching. The sensor device 1 is soldered to the cavity 75 by the bump electrodes 45. An underfill 78 is provided around the bump electrodes 45.

In a state in which the sensor device 1 is mounted in the cavity 75 of the cavity housing 70, a fluorine-based waterproof coating agent 90 is applied to the surface of the cavity housing 70, the surface of the underfill 78, and the surface of the sensor device 1. After applying the fluorine-based waterproof coating agent 90, the cavity housing 70 is diced or snapped into individual pieces.

FIG. 4B illustrates an example in which a frame section 85 is provided on a flat substrate 80 and the sensor device 1 is mounted therein. The sensor device 1 is soldered to a predetermined position of the flat substrate 80 via the bump electrodes 45. The underfill 78 is provided around the bump electrode 45. After the underfill 78 is provided, the frame section 85 is adhered to the surrounding area of the sensor device 1.

In a state in which the sensor device 1 is mounted on the substrate 80 and the frame section 85 is adhered thereto, the fluorine-based waterproof coating agent 90 is applied to the surface of the substrate 80, the surface of the frame section 85, the surface of the underfill 78, and the surface of the sensor device 1. After applying the fluorine-based waterproof coating agent 90, the substrate 80 and the frame section 85 are diced into individual pieces.

Figure 5:
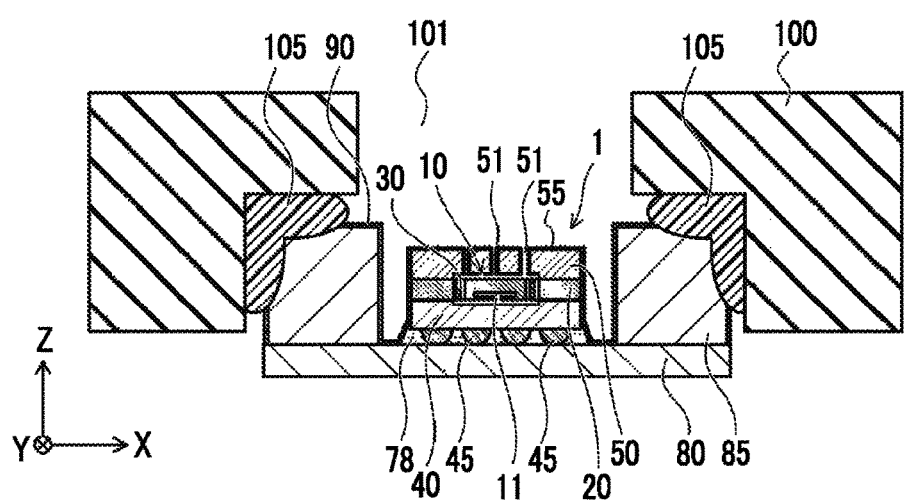
FIG. 5 is a sectional view illustrating a state in which the sensor device is attached to a housing.

FIG. 5 is a sectional view illustrating a state in which the sensor device is attached to a housing.

As illustrated in FIGS. 4A and 4B, the sensor device 1 is mounted in the cavity housing 70 or on the substrate 80, and the fluorine-based waterproof coating agent 90 is applied to the surface of each part. In this state, the sensor device 1 is attached to a hole 101 of a housing 100. For example, an O-ring 105 is provided between the housing 100 and the sensor device 1. Since the sensor device 1 and the like exposed from the hole 101 are covered with the fluorine-based waterproof coating agent 90, high waterproofness is provided. In addition, infiltration of water into the housing 100 through the hole 101 is prevented by the O-ring 105.

Since the fluorine-based waterproof coating agent 90 described above is applied, the sensor device 1 having excellent water resistance can be provided. In addition, when the functional film 55 is formed on the inner wall surfaces of the through-holes 51 of the lid portion 50, infiltration of water into the cavity C through the through-holes 51 can be prevented.

As described above, according to the embodiment, it is possible to provide the sensor device 1 capable of preventing infiltration of moisture into the device in which the movable thin film 11 is provided.

Although the embodiment has been described above, the present invention is not limited to this example. For example, the outer shape of the sensor portion 10 or the movable thin film 11 in the plan view may also be a shape other than the rectangular shape. It should be understood by those skilled in the art that various modifications, combinations, sub-combinations and alterations may occur depending on design requirements and other factors insofar as they are within the scope of the appended claims of the equivalents thereof.

What is claimed is:
1. A sensor device comprising:
   a sensor portion including:
      a movable thin film; and
      a detection element configured to output a detection signal corresponding to an amount of displacement of the movable thin film;

a frame portion surrounding and supporting the sensor portion;

a circuit board including a circuit configured to process the detection signal from the detection element;

a lid portion attached onto the frame portion, the lid portion made of silicon and having at least one through-hole formed by an etching; and a functional film formed on at least an inner surface of the at least one through-hole, the functional film being formed from a portion of the silicon reacted with an etching gas of the etching, the functional film having higher hydrophobicity than that of a surface of the lid portion.

2. The sensor device according to claim 1, wherein the functional film is provided over an upper surface of the lid portion to the inner surface of the at least one through-hole.

3. The sensor device according to claim 1, wherein the functional film contains fluorocarbon.

4. The sensor device according to claim 1, wherein the lid portion, the frame portion, and the circuit board are electrically connected to each other.

5. The sensor device according to claim 4, wherein potentials of the lid portion and the frame portion are set to a reference potential of the circuit board.

6. The sensor device according to claim 1, wherein the frame portion has a cavity in which the sensor portion is disposed.

7. The sensor device according to claim 6, wherein the at least one through-hole opens to the cavity so as to provide the cavity with communication to outside atmosphere.

8. The sensor device according to claim 1, wherein the frame portion and the sensor portion are disposed on the circuit board by bonding the frame portion to the circuit board such that a gap is formed between the sensor portion and the circuit board.

9. The sensor device according to claim 1, wherein the higher hydrophobicity of the functional film prevents water or moisture from entering the sensor portion through the at least one through-hole.

* * * * *